Patented May 23, 1950

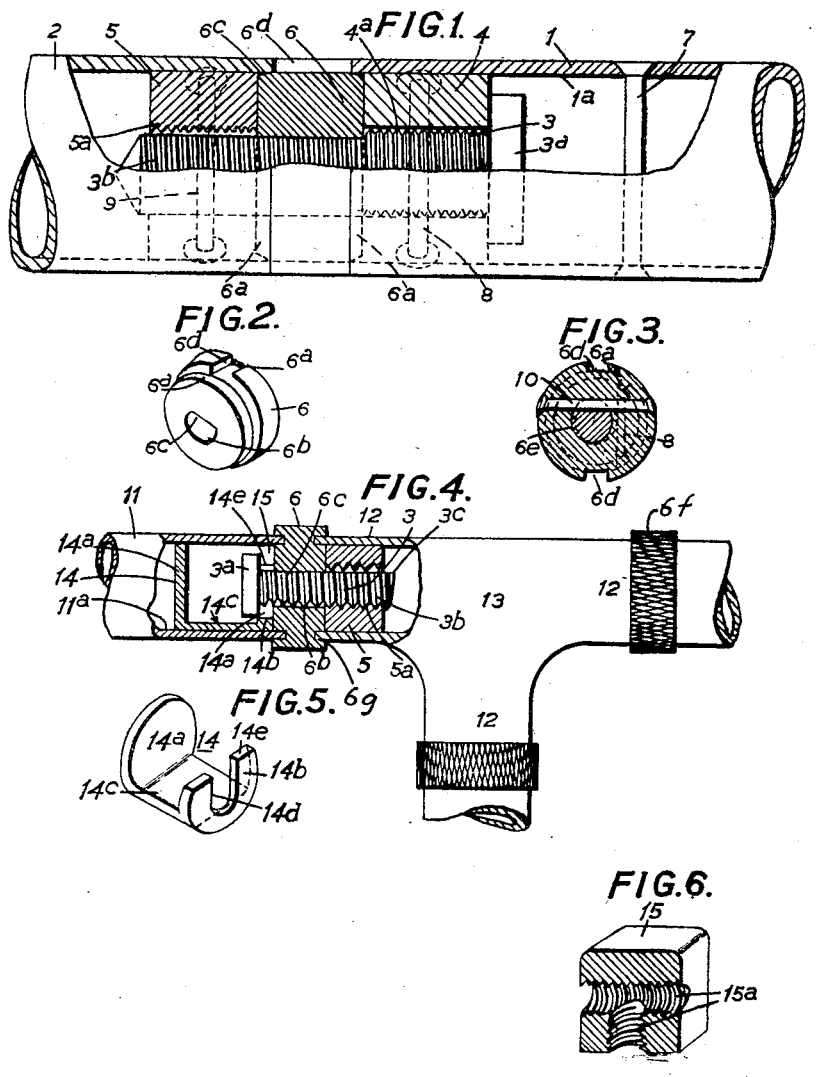
May 23, 1950     G. H. GASCOIGNE     2,508,668
TUBE JOINT
Filed Nov. 19, 1945

2,508,668

UNITED STATES PATENT OFFICE 2,508,668

TUBE JOINT

George Harry Gascoigne, Wokingham, England

Application November 19, 1945, Serial No. 629,529
In Great Britain November 20, 1944

2 Claims. (Cl. 287—54)

This invention relates to screwed jointing or coupling means between two tubes or rods or equivalent structural members.

One object of the invention is to provide screwed jointing or coupling means suitable for operating between structural members in cases where it is inconvenient or impracticable to bodily rotate one or other of the members being joined, or coupled together.

Another object of the invention is to provide mechanical jointing or coupling means embodying complemental screw engaging parts provided on or in association with two structural members to be joined or coupled together, where both the said members are of tubular form; in such cases some form of plug or other fitting has to be inserted in the open end of each tubular member. Alternatively one of each pair of members to be joined may be of solid form and suitably screw threaded to co-operate with a screw threaded portion associated with the other of said pair of members. In the following description and claims the phrase "jointing members of the character specified" is intended to embrace broadly jointing means for interconnecting structural elements of these different kinds.

A further object of the invention is to provide what might be termed a flush type joint, that is, where the two members to be joined and that portion of the means whereby the jointing is effected all have the same cross sectional form so that the surfaces of the joined and joining members are flush one with the other. The achievement of this object renders the invention especially applicable to the erection of the handrails and guard rails and of skeleton frameworks for buildings or for a mobile structure, such as a truck chassis or a normally fixed or stationary structure, such as the body of an article of tubular metal furniture. The ability to join together the several structural frame parts of an article of tubular metal furniture is of particular value from the point of view of facilitating handling the frame parts during manufacture, since it is possible to connect the parts together after they have been plated or otherwise surface finished with very little risk of damaging the finished surface during assembly, whereas at present it is necessary to fabricate the entire frame, usually by welding the tubes together, and pass this, usually cumbersome, article to the plating or finishing processes.

A still further object of the invention is to provide a jointing means which may be applied for connecting a plain ended tube or member to regular standard screwed pipe fittings such as elbows, tees, crosses or the like having internal screw threads primarily intended to receive the externally threaded ends of lengths of piping.

For a clearer understanding of the invention reference may now be made to the accompanying drawings, which are illustrative of several embodiments of the invention, and in which—

Figure 1 is a part sectional elevation of jointing means applied to connect together two axially aligned tubular structural members;

Figure 2 is a pictorial view of the jointing device employed in the jointing means shown in Figure 1, Figure 3 is a detail view of a modification described later.

Figure 4 is a part sectional elevation showing another construction of jointing means, as applied to connecting three tubular members to a common junction;

Figure 5 is a pictorial view of the anchorage element used in the construction of Figure 4, and Figure 6 shows a solid form of junction member to which one, two or three tubular structural members may be connected.

Figure 1 illustrates a flush-type joint according to the invention, that is, one in which the two joined and interposed joining members all have the same cross sectional form, which is a circular form in the illustrated embodiment. The joint between the two tubular members 1 and 2 respectively forming, for example, parts of a hand rail or a guard rail is effected by means of a bolt 3 which is mounted in the tube 1 on an anchorage element 4 so as to be capable of rotation about its longitudinal axis and also of controlled endwise movement in or substantially in the direction of said axis. The bolt 3 is adapted to screw into a plug 5 secured to the tube 2 when rotated by means of an operating device 6 which is interposed between the opposed ends of said tubes 1 and 2. Before the tube 1 is joined to the tube 2 the bolt 3 is loosely retained within the open end of the tube 1 by the anchorage fitting which is in the form of a plug 4 having a plain bore 4ª through which freely passes the shank 3ᵇ of the bolt 3. Behind the anchorage plug 4 a pin 7 is passed diametrically through the tube 1, across the bore 1ª thereof, and is fastened in this position by rivetting or in some other suitable manner. The pin 7 is spaced behind the plug 4 at a distance which limits the inward endwise movement of the bolt 3 which is freely rotatable within said plug 4 so that if the device 6 is placed around the bolt 3 at least two or three threads at the extremity of the bolt shank 3ᵇ project beyond the front of the device 6 when abutting against the front face of the anchorage plug 4. The plug 4 is fixed within the open end of tube 1 by brazing or, as shown, by means of a rivet 8 or in some other suitable manner. The plug 5 is similarly shown fixed in tube 2 by a rivet 9, said plug 5 having a tapped bore 5ᵃ.

The bolt shank 3ᵇ is provided with a longitudinal flat 3ᶜ so that the said shank becomes substantially D-shaped in cross section. The operating device 6 is in the form of a disc having spigots 6ᵃ formed on the opposite faces thereof (see Figure 2) for entering into the open ends of the tubes 1 and 2 and said disc is provided with a centrally disposed plain aperture 6ᵇ having the same cross sectional D-shape as the bolt shank 3ᵇ with a flat 6ᶜ corresponding to the bolt flat 3ᶜ. The periphery of the disc 6 is provided with one or more notches or cross gaps 6ᵈ, the purpose for which is described later.

Alternatively as shown in Figure 3 the disc 6 may have a circular bore 6ᵉ which is made, in effect, into a D-shape in cross section by means of a pin 10 extending transversely through the disc 6.

The action of joining together the tubes 1 and 2 is as follows: Assume the tubes 1 and 2 to be supported in axial alignment and the tube 2 free to move toward tube 1. The operating disc 6 is slipped over the end of the bolt shank 3ᵇ so that the said disc 6 bears against the anchorage plug 4, in which position the extremity of the bolt shank 3ᵇ projects out beyond the disc 6. The tube 2 is then advanced so as to align the tapped bore 5ᵃ of its plug 5 with the projecting end of the bolt shank 3ᵃ. The disc 6 is then rotated, by hand, and as it rotates it imparts a rotary motion to the bolt 3 by reason of the interfitting complemental disc aperture and bolt shank. Since the bolt 3 is free to rotate in its anchorage it is screwed by virtue of the imparted rotary motion into engagement with the tapped bore 5ᵃ of the plug 5 of the tube 2, until the bolt head 3ᵃ is in contact with the rear face of the anchorage plug 4 and the disc 6 is clamped firmly between the ends of tubes 1 and 2. A final tightening movement is imparted to disc 6 to bind the tubes 1 and 2 and the interposed disc 6 rigidly together by engaging a suitable wrench or drift with a peripheral notch 6ᵈ of said disc 6.

Figure 4 of the accompanying drawings shows jointing means according to the invention employed for connecting three tubes 11 to the three branches 12 of a common T-junction 13. In the case of each of the tubes 11 the components of the jointing means are substantially the same as those shown in Figure 1. The main difference in this construction lies in the use of an anchorage fitting 14 which combines the functions of the anchorage plug 4 and bolt abutment pin 7 shown in Figure 1, said fitting 14 consisting of a cradle-like element (see Fig. 5) comprising a rear disc 14ᵃ and a front wall 14ᵇ integrally joined to said disc 14ᵃ by a floor 14ᶜ, the underside of which is adapted to fit snugly within the bore 11ᵃ of the tube 11. The anchorage fitting 14 is brazed or otherwise fixedly secured within the open end of the tube 2. A slot 14ᵈ extends in from the upper edge 14ᵉ of the wall 14ᵇ of the anchorage fitting 14, and said edge 14ᵉ terminates short of the inner surface of the tube bore 11ᵃ to provide a gap 15 through which the head 3ᵃ of the bolt 3 can be manoeuvred so as to locate said bolt head 3ᵃ behind the anchorage fitting wall 14ᵇ. The thickness of the bolt head 3ᵃ, the length of the bolt shank 3ᵇ and the distance between the opposing faces of the front wall 14ᵇ and the rear disc 14ᵃ are gauged so that when the head 3ᵃ of the loose bolt 3 is contacting with the rear disc 14ᵃ of the anchorage fitting 14 and the disc 6 has been slipped over the bolt shank 3ᵇ to rest against the face of the anchorage wall 14ᵇ at least two or three threads of said shank 3ᵇ still project beyond the front face of the disc 6. In this case the disc is shown with a knurled periphery 6ᶠ instead of the notches 6ᵈ shown in Figure 1, the lips of the open ends of the tube 11 and junction branch 12 being received within annular grooves 6ᵍ provided on opposite faces of the disc 6. The manner of joining each tube 11 to the common T junction 13 is substantially the same as that of joining together the two tubes 1, 2 shown in Figure 1 and accordingly no description of the joining action of the assembly shown in Figure 4 is necessary.

The invention is not limited to jointing means for interconnecting lengths of tubes or for connecting one or more tubes to a common junction member of tubular T, L or X form. Solid structural members may be joined together equally well, provided one of each of a pair of interconnected members is hollowed at one end to receive an anchorage in which the bolt or its equivalent can be rotatably mounted. By way of example, Figure 6 shows a junction member in the form of a solid block 15 having a series of tapped holes 15ᵃ within each of which may be engaged the bolt 3 of structural member.

I claim:

1. A jointing means of the character specified comprising an anchorage element within the open end of a first tubular member, an externally screw-threaded element having a head at one end thereof and mounted capable of rotation and of endwise movement and having a longitudinally extending flattened surface extending a substantial distance from the end thereof remote from said head, in relation to said anchorage element, a non-adjustable stop fixed within, and at a set distance from the open end of said tubular member coacting with said head to limit retraction of said screw-threaded element to ensure always projection beyond the anchorage element of at least a short length of the threaded exterior of the said screw-threaded element when it is the position in which it is arrested by said abutment, an interiorly screw-threaded plug element mounted within an opening of a second member so as to be held against retraction within said opening and operating means apertured to pass over the projecting end of the screw-threaded element, said operating means having a flattened surface therein formed so as to impart rotation to said screw-threaded element associated with the first member by coaction with the flattened surface of said screw-threaded element to draw said screw-threaded element to the former limit of its endwise movement relative to the anchorage element and to screw it into the screwed plug associated with the second member and by coaction of said head with said anchorage element thereby to effect coupling between said first and second members without bodily rotation of either of them.

2. A jointing means of the character specified comprising an anchorage element within the open end of a first tubular member, an externally threaded element having a head at one end thereof mounted capable of rotation and of endwise movement and having a longitudinally extending flattened surface extending a substantial distance from the end thereof remote from said head, said anchorage element consisting of a rear disc constituting an endwise non-adjustable stop for limiting the inward endwise movement of the screw-threaded element by abutment with said head, to ensure always projection beyond the anchorage element of at least a short length of the threaded exterior of the said screw-threaded element when it is in the position in which it is arrested by said rear disc, and of a front wall interconnected to said rear disc and having a slot therein for receiving the shank of the headed bolt, the clearance divided between the slotted edge of said wall and the opposing interior surface of the tubular member within which the anchorage element is mounted permitting of the passage of the head of the bolt to position said head behind the wall, an interiorly screw-threaded plug element mounted within an opening of a second member so as to be held against retraction within said opening and operating means apertured to pass over the projecting end of the screw-threaded element, said operating means having a flattened surface therein formed so as to impart rotation to said screw-threaded element associated with the first member by coaction with the flattened surface of said screw-threaded element to draw said screw-threaded element to the former limit of its endwise movement relative to the anchorage element and to screw it into the screwed plug associated with the second member and by coaction of said head with said front wall of said anchorage element thereby to effect coupling between said first and second members without bodily rotation of either of them.

GEORGE HARRY GASCOIGNE.

REFERENCES CITED

The following references are of record in the file of this patent:

UNITED STATES PATENTS

| Number | Name | Date |
|---|---|---|
| 932,744 | Adams | Aug. 31, 1909 |
| 1,596,317 | Skinner | Aug. 17, 1926 |
| 1,884,073 | Metzger | Oct. 25, 1932 |
| 2,417,177 | Raybould | Sept. 10, 1940 |
| 2,298,516 | Streib | Oct. 13, 1942 |
| 2,317,818 | Skulkety | Apr. 27, 1943 |

FOREIGN PATENTS

| Number | Country | Date |
|---|---|---|
| 68,148 | Norway | Oct. 1, 1929 |
| 448,793 | France | Feb. 10, 1913 |